United States Patent
Lanni et al.

(10) Patent No.: US 9,237,191 B2
(45) Date of Patent: Jan. 12, 2016

(54) SPLITTING OF PROCESSING LOGICS ASSOCIATED WITH COMMANDS OF PAGES IN A DISTRIBUTED APPLICATION

(71) Applicant: International Business Machines Corporation, Armonk, NY (US)

(72) Inventors: Leonardo Lanni, Rome (IT); Luca Lazzaro, Rome (IT); Alessandro Scotti, Rome (IT); Antonio M. Sgro, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/867,177

(22) Filed: Apr. 22, 2013

(65) Prior Publication Data

US 2014/0156732 A1 Jun. 5, 2014

(30) Foreign Application Priority Data

Dec. 4, 2012 (GB) .................................. 1221754.3

(51) Int. Cl.
*G06F 15/16* (2006.01)
*H04L 29/08* (2006.01)
*G06F 9/50* (2006.01)

(52) U.S. Cl.
CPC ............ *H04L 67/10* (2013.01); *G06F 9/505* (2013.01); *G06F 9/5044* (2013.01); *H04L 67/02* (2013.01);
(Continued)

(58) Field of Classification Search
CPC . G06F 9/5044; G06F 2209/509; H04L 67/02; H04L 67/04; H04L 67/10; H04L 67/34
USPC ........................................... 709/203, 223–224
See application file for complete search history.

(56) References Cited

U.S. PATENT DOCUMENTS 6,078,960 A 6/2000 Ballard
6,578,068 B1 6/2003 Bowman-Amuah
(Continued)

FOREIGN PATENT DOCUMENTS

WO WO2014/086656 A2 6/2014

OTHER PUBLICATIONS

Fuggetta, Alfonso et al., "Understanding Code Mobility", IEEE Transactions on Software Engineering, vol. 24, No. 5, May 1998, pp. 342-361.
(Continued)

*Primary Examiner* — Hitesh Patel
(74) *Attorney, Agent, or Firm* — Francis Lammes; Stephen J. Walder, Jr.; Joseph Petrokaitis (57) ABSTRACT

A mechanism is provided for controlling a distributed application. An indication of a computational capability of a client computing machine and of a server computing machine is detected. At least part of a page is built in response to a request received by the server computing machine from the client computing machine. The at least part of the page comprising a set of commands each one for submitting a next request on the client computing machine. Processing logic for serving each next request being split between a client processing component and a server processing component. The page with the client processing component for each command is returned to the client computing machine for causing the client computing machine to load the page and execute each client processing component in response to the corresponding next request. Each server processing component is executed in response to the corresponding next request.

18 Claims, 7 Drawing Sheets

(52) U.S. Cl.
CPC ........ *H04L 67/303* (2013.01); *G06F 2209/509* (2013.01); *G06F 2209/5017* (2013.01); *H04L 67/04* (2013.01); *H04L 67/34* (2013.01)

(56) References Cited

U.S. PATENT DOCUMENTS

| | | | |
|---|---|---|---|
| 6,594,699 B1* | 7/2003 | Sahai et al. | 709/228 |
| 6,678,715 B1* | 1/2004 | Ando | 718/105 |
| 7,689,714 B1 | 3/2010 | Zaumen | |
| 8,112,473 B2 | 2/2012 | Saillet | |
| 8,190,703 B2 | 5/2012 | Lin et al. | |
| 8,250,182 B2 | 8/2012 | Frank et al. | |
| 2003/0014478 A1 | 1/2003 | Noble | |
| 2003/0018834 A1* | 1/2003 | Eilers et al. | 710/1 |
| 2007/0121516 A1* | 5/2007 | Hannel et al. | 370/241 |
| 2010/0138475 A1* | 6/2010 | Frank et al. | 709/203 |
| 2010/0268764 A1 | 10/2010 | Wee et al. | |
| 2010/0318999 A1 | 12/2010 | Zhao et al. | |
| 2011/0320520 A1 | 12/2011 | Jain | |
| 2012/0137311 A1 | 5/2012 | Wu | |

OTHER PUBLICATIONS

Kuuskeri, Janne et al., "Partitioning Web Applications Between the Server and the Client", SAC'09, Honolulu, Hawaii, Mar. 8-12, 2009, pp. 647-652.
List of IBM Patents or Patent Applications Treated as Related (Appendix P), Jun. 12, 2015, 2 pages.
PCT International Search Report (PCT/ISA/210) dated Oct. 22, 2014, Application No. PCT/EP2013/074956, 4 pages.
Cuervo, Eduardo et al., "MAUI: Making Smartphones Last Longer with Code Offload", MobiSys'10, San Francisco, California, Jun. 15-18, 2010, 14 pages.
Hens, Raf et al., "Runtime Deployment Adaptation for Resource Constrained Devices", IEEE International Conference on Pervasive Services, Jul. 1, 2007, pp. 335-340.

* cited by examiner

SPLITTING OF PROCESSING LOGICS ASSOCIATED WITH COMMANDS OF PAGES IN A DISTRIBUTED APPLICATION

BACKGROUND

The solution according to one or more embodiments of the present invention relates to the data processing field. More specifically, this solution relates to distributed software applications.

Distributed software applications (or simply distributed applications), wherein a server computing machine (or simply server) offers a service that may be exploited by a large number of users accessing the server with their client computing machines (or simply clients), are commonplace in modern data-processing systems, especially in the Internet. A typical example is a web application, which exposes a web interface based on web pages that are downloaded within a web browser of the clients. The interaction with the web application involves the submission of requests to the server by selecting corresponding commands of a current web page; the server processes each request, and returns a corresponding response (typically involving the downloading of a new web page, or a part thereof). The web applications have become very popular in the recent years, especially thanks to the ubiquity of the web browsers (only required to access them) and to their simplified management (typically not requiring any action on the clients).

In modern web applications, each web page may comprise client processing components (for example, based on the JavaScript technology), each one associated with a command of the web page for its execution on the client in response to the selection of the command—for example, as described in "Partitioning Web Applications Between The Server And The Client, Janne Kuuskeri, Tommi Mikkonen, SAC '09 Proceedings of the 2009 ACM symposium on Applied Computing", in U.S. Pat. No. 8,112,473 and in U.S. Pat. No. 8,190,703 (the entire disclosures of which are herein incorporated by reference). As a result, part of a processing logic required to serve each request is moved to the clients, wherein its may be executed without requiring any interaction with the server. This improves the performance of the server, and reduces the network traffic (between the clients and the server).

However, the more and more processing logic that is moved to the clients may cause an overload thereof with a detrimental effect on their performance. This is particularly acute in clients with limited computational capability (for example, entry level smart-phones).

This problem is not solved by the fact that very often the web applications have ad-hoc web interfaces that are customized for specific clients (such as of the mobile type); these web interfaces may also be generated dynamically on the clients by a browser server updating general-purpose web interfaces according to web interface data received from the server, as described in US-A-2012/0137311 (the entire disclosure of which is herein incorporated by reference). The above-mentioned web interfaces are optimized for the common features of the corresponding clients (for example, touch screens of small size), and generally provide a reduced set of functionalities. However, in this case as well the same client processing components associated with each web page are to be executed on all the clients that download it (with the same drawbacks pointed out above).

On the other hand, each server may become overloaded (for example, when too many clients access it). In this case, the performance of the server degrades with a detrimental effect on the level of quality of the provided services. In order to tackle this problem, load-balancing techniques are commonly used. In this case, the same web application is replicated onto a plurality of servers, which are grouped into a cluster exposing a single access point to the clients. The different requests from the clients are then distributed across the servers of the cluster (in a way completely transparent to the clients); for example, the requests may be distributed to the servers with a round-robin policy, according to their current workload, or with more complex policies—for example, as described in U.S. Pat. No. 6,578,068 (the entire disclosure of which is herein incorporated by reference). In this way, it is possible to optimize the usage of the servers of the cluster. Alternatively, as described in US-A-20100268764 (the entire disclosure of which is herein incorporated by reference), a client-side JavaScript logic may be used to change an address pointing to the server (so as to use the one that is best suited to serve the requests of the client).

However, in this case as well the cluster may become overloaded (with the same drawbacks pointed out above).

In both cases, the servers are generally to be over-dimensioned so as to ensure the required performance under peak conditions of their workload. However, this involves a waste of computational resources in normal situations.

Techniques for balancing the workload among the server and the clients have also been proposed in completely different architectures.

For example, U.S. Pat. No. 8,250,182 (the entire disclosure of which is herein incorporated by reference) relates to a server that hosts virtual machines for the clients; in this case, the server negotiates (with each client) the operations that are executed on the server and on the client according to capacity information of the client (possible taking into account the current workload of the server as well), with this operation that may be performed either statically (when the client requests to connect to the server) or dynamically (in response to a re-balancing request). However, this architecture requires that the client should be specifically configured for accessing the virtual machines of the server.

Moreover, US-A-20030014478 (the entire disclosure of which is herein incorporated by reference) relates to a distributed web browser wherein its functions (for accessing a web server) are split between a web browser client (running on a client) and a web browser server (running on a proxy server); the location at which parsing, layout and rendering processes of the web pages are performed is changed (either statically or dynamically) according to the workload of one or both of the client and the proxy server. However, this technique is not applicable to standard web applications.

In both cases, the above-described techniques are quite intrusive, since they require acting heavily on the clients to change their operation.

SUMMARY

The solution according to one or more embodiments of the present invention is based in the idea of splitting the processing logic associated with each command of pages of the distributed application.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for controlling a distributed application, wherein a processing logic for serving each next request that may be submitted with corresponding commands of a page (or a part thereof) is split between a client processing component and/or a server processing component according to an indication of a computational capability of the client computing machine and/or of the server computing machine.

A further aspect of the solution according to an embodiment of the invention provides a corresponding computer program.

A further aspect of the solution according to an embodiment of the invention provides a corresponding computer program product.

A further aspect of the solution according to an embodiment of the invention provides a corresponding system.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
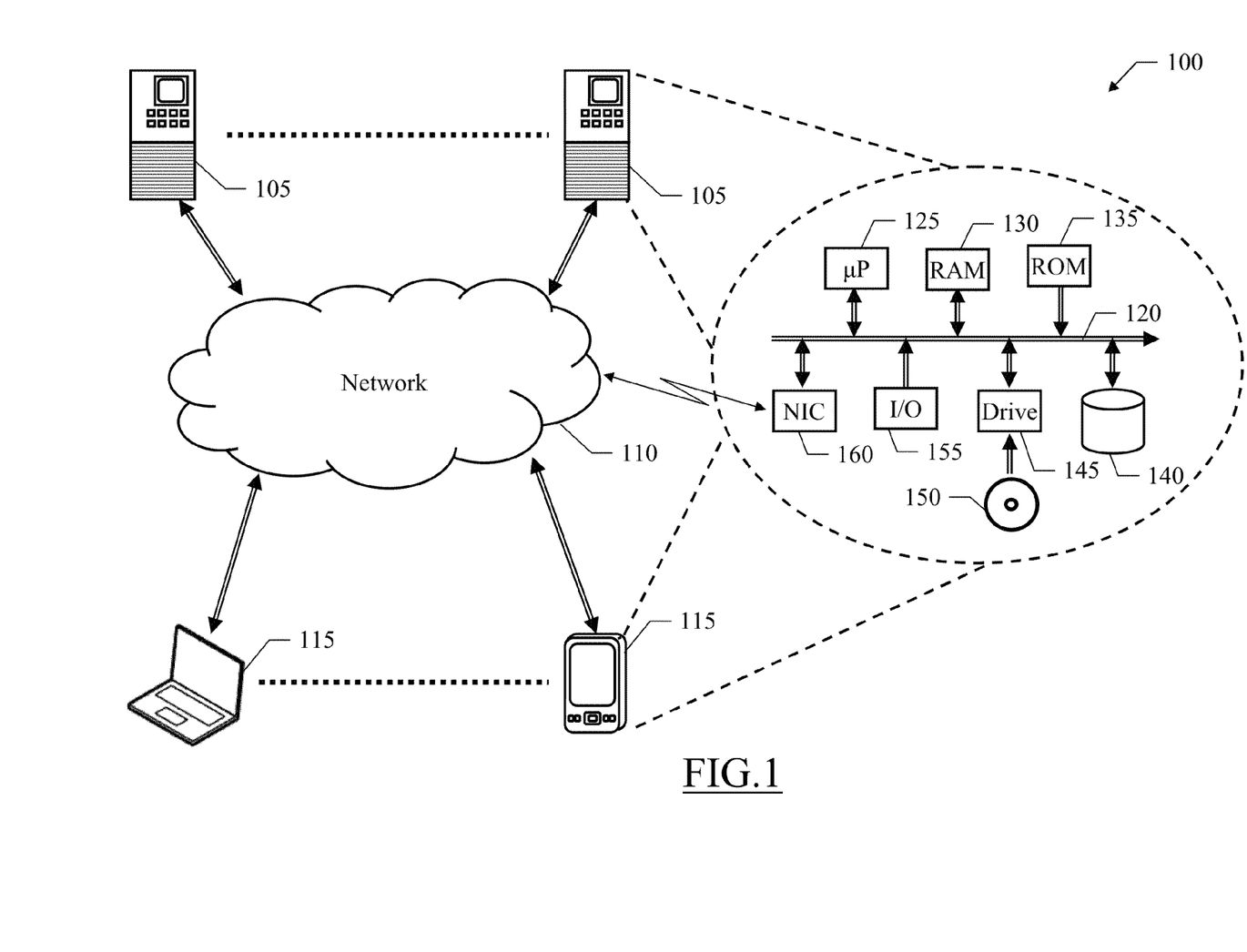
FIG. 1 shows a pictorial representation of a data-processing infrastructure that may be used to practice the solution according to an embodiment of the invention.

With reference in particular to the FIG. 1, a pictorial representation is shown of a data-processing infrastructure 100 that may be used to practice the solution according to an embodiment of the invention.

The data-processing infrastructure 100 has a distributed architecture, typically based on the Internet; the Internet is formed by millions of servers 105, which are connected one to another through a global communication network 110. A subset of the servers 105, known as World Wide Web (or simply web), allows accessing corresponding web sites; each web site comprises a collection of web pages (connected one to another through corresponding hyper-links, starting from a home page). Each web page is defined by a hypertext document (formatted in the HTML language), which document is accessed through the HTTP protocol; for this purpose, the web page is identified and localized by means of a corresponding URL, which consists of a unique string formatted according to a standard syntax. Users of clients 115 access the Internet (through computers that operate as access providers, not shown in the figure), in order to exploit the services offered by the servers 105 (and in particular to download desired web pages). A large variety of clients 115 may be used to access the Internet; for example, the clients 115 may be desktops, notebooks, net-books, tablets, smart-phones, and so on.

A generic server or client computing machine (or simply computer) 105,115 of the data-processing infrastructure 100 is formed by several units that are connected in parallel to a bus structure 120 (with a structure that is suitably scaled according to the type of the computer 105,115). In detail, a set of (one or more) microprocessors (μP) 125 controls operation of the computer 105,115; a RAM 130 is directly used as a working memory by the microprocessors 125, and a ROM 135 stores basic code for a bootstrap of the computer 105,115. A mass memory comprises internal storage units 140 (for example, a hard-disk or a flash memory) and drives 145 for external storage units 150 (for example, optical disks or memory cards). Moreover, the computer 100 comprises input/output units 155 (for example, a monitor, a keyboard, a mouse or a touch-screen), and a network adapter 160 for connecting the computer 105,115 to the network 110.

An exemplary scenario of application of the solution according to an embodiment of the invention is shown in the FIG. 2A-FIG. 2E.

Figure 2A:
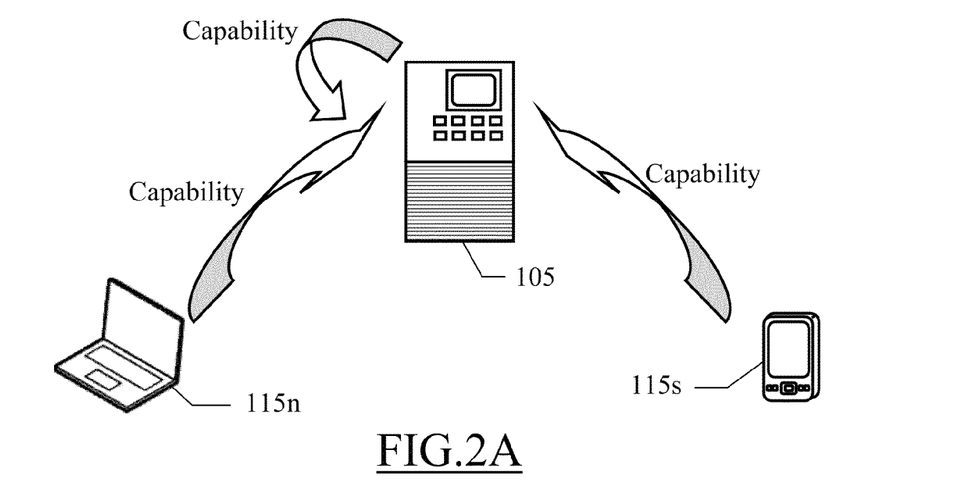
FIG. 2A-FIG. 2E show an exemplary scenario of application of the solution according to an embodiment of the invention.

Starting from the FIG. 2A, different clients (for example, a top-level notebook and an entry-level smart-phone, differentiated with the references 115n and 115s, respectively), may access a web application hosted on a generic server 105. In the solution according to an embodiment of the invention, an indication of a computational capability of each client 115n, 115s and/or of the server 105 is detected (for example, by collecting information about computational resources of each client 115n,115s when it accesses the web application).

Figure 2B:
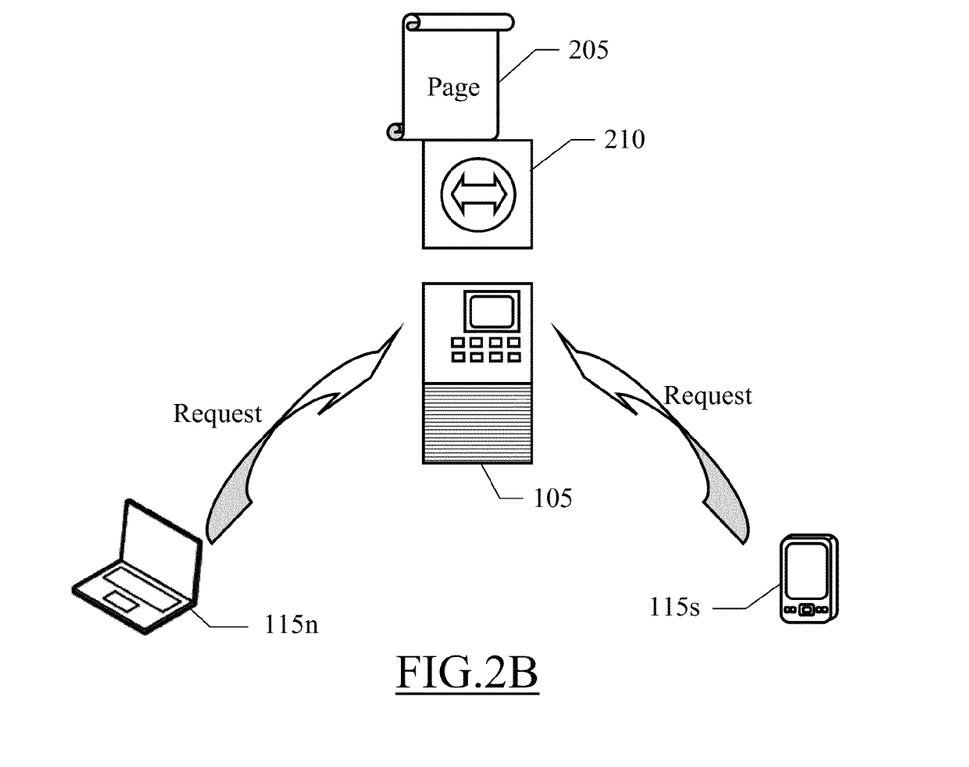

Moving to the FIG. 2B, the user of each client 115n,115s submits a request to the server 105 for downloading a selected web page 205 of the web application (for example, its home page at the beginning) The web page 205 comprises one or more commands that may be used on the clients 115n,115s for submitting corresponding next requests; each command is associated with a processing logic 210 for serving the corresponding next request. For example, a command of the web page 205 may be used to submit a request for adding an input string to a database; the corresponding processing logic 210 performs a regular expression validation of the input string, and displays an error message if the input string is not correct or adds it to the database otherwise.

Figure 2C:
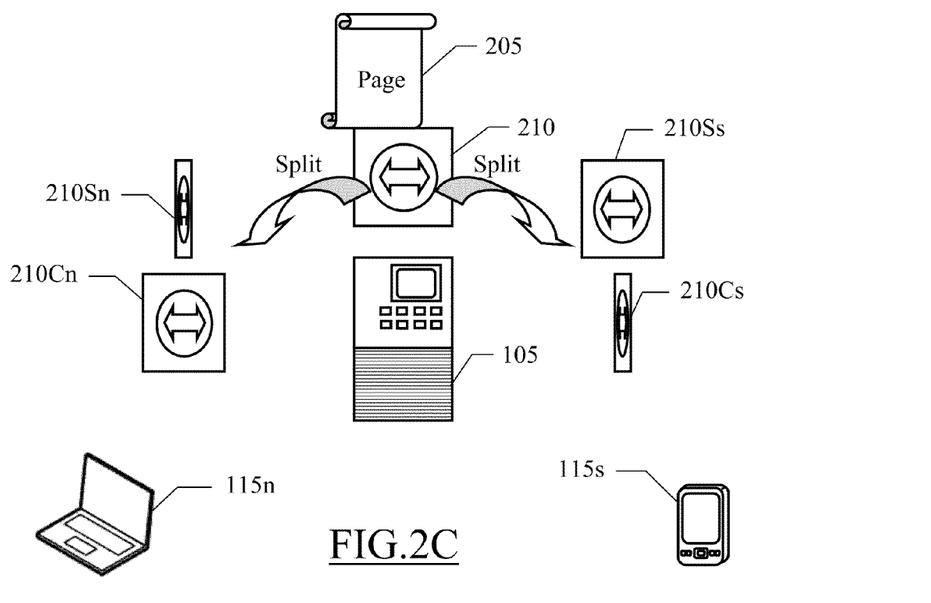

As shown in the FIG. 2C, for each client 115n,115s the processing logic 210 is split between a client processing component and/or a server processing component according to the corresponding computational capability. For example, in the case of the more powerful notebook 115n, the processing logic 210 is split between a heavy client processing component 210Cn and a light server processing component 210Sn; conversely, in the case of the less powerful smart-phone 115s, the processing logic 210 is split between a light client processing component 210Cs and a heavy server processing component 210Ss.

Figure 2D:
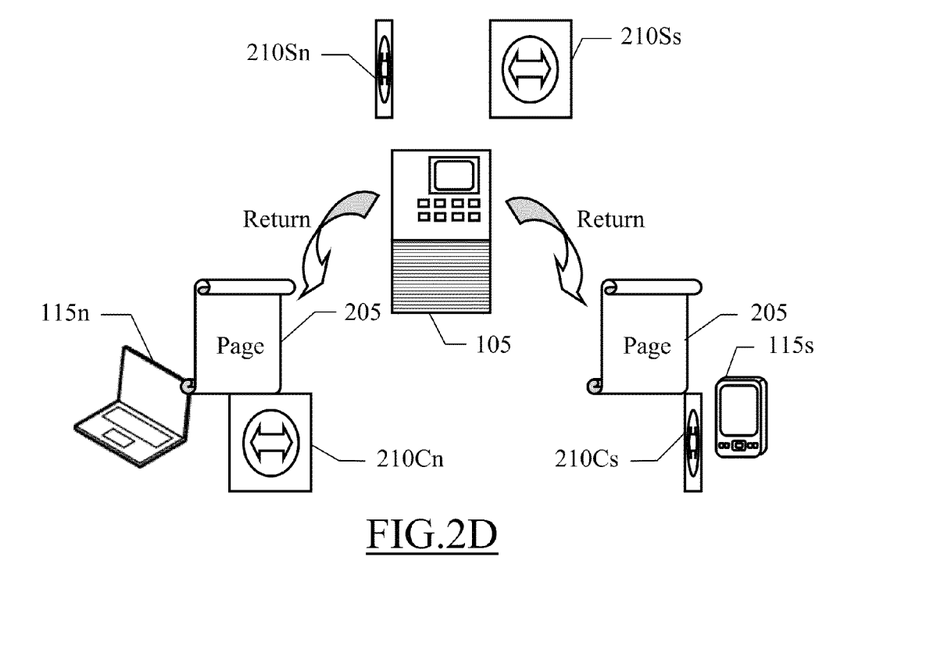

With reference now to the FIG. 2D, the web page 205 with the client processing components 210Cn is returned to the client 115n, and the same web page 205 but with the client processing components 210Cs is returned to the client 115s (whereas all the server processing components 210Sn,210Ss remain on the server 105).

Figure 2E:
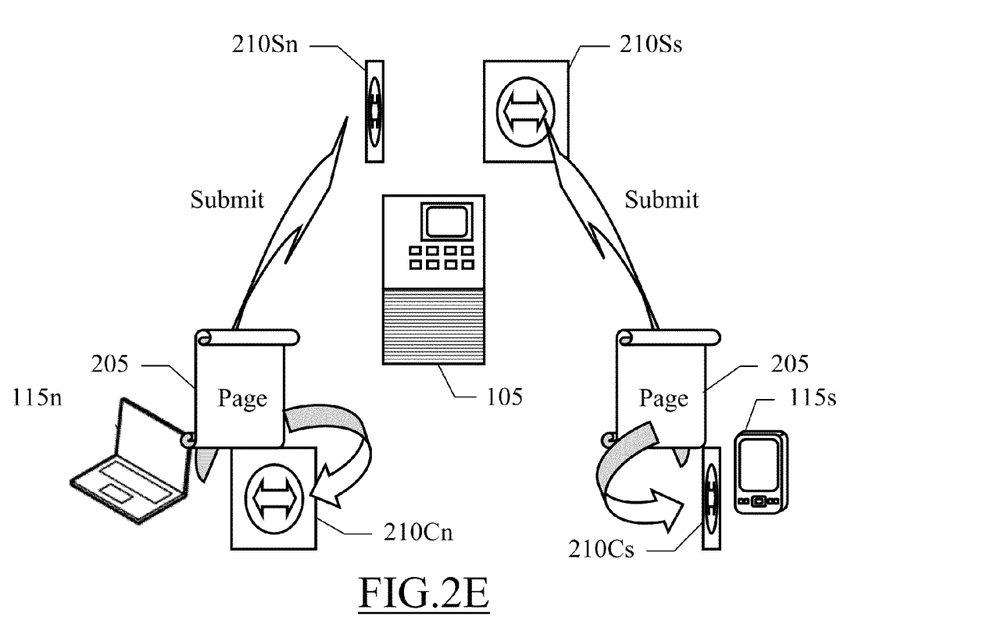

Moving to the FIG. 2E, the user of each client 115n,115s selects the same command for submitting the same request (for example, by clicking on a corresponding button of the web page 205). This causes the execution of the corresponding client processing components 210Cn and 210Cs on the clients 115n and 115s, respectively; the client processing components 210Cn and 210Cs process the request locally, and then send the (processed) request to the server 105. This causes the execution of the server processing components 210Sn and 210Ss, respectively, on the server 105; the server processing components 210Sn and 210Ss further process the request remotely (with the same operations that may be reiterated one or more times).

For example, in the above-mentioned case, on the notebook 115n the client processing component 210Cn validates the input string and displays the error message if the input string is not correct or sends it to the server 105 otherwise, whereas the server processing component 210Sn simply adds the (already validated) input string to the database; conversely, on the smart-phone 115s the client processing component 210Cs simply sends the input string to the server 105, whereas the server processing component 210Ss validates the input string and adds the input string to the database if it is correct or returns the error message to the smart-phone 115s wherein the client processing component 210Cs displays it otherwise.

In this way, the processing logics are split between the client and the server according to the computational capability of the client, of the server or of both of them. For example, the client processing components may self-adapt to the computational capability of the client; in addition or in alternative, the server processing components may self-adapt to the computational capability of the server. In both cases, this has a beneficial effect on the performance of the client and/or the server.

The above-described solution allows distributing the workload at component level between the client and the server, so that the code (and the data) always travels between the client and the server (unlike the standard load-balancing techniques that act at the processing level among different servers, so that only data travels among them).

In any case, this solution does not require any substantial change to the operation of the clients; therefore, the solution is of general applicability.

Figure 3:
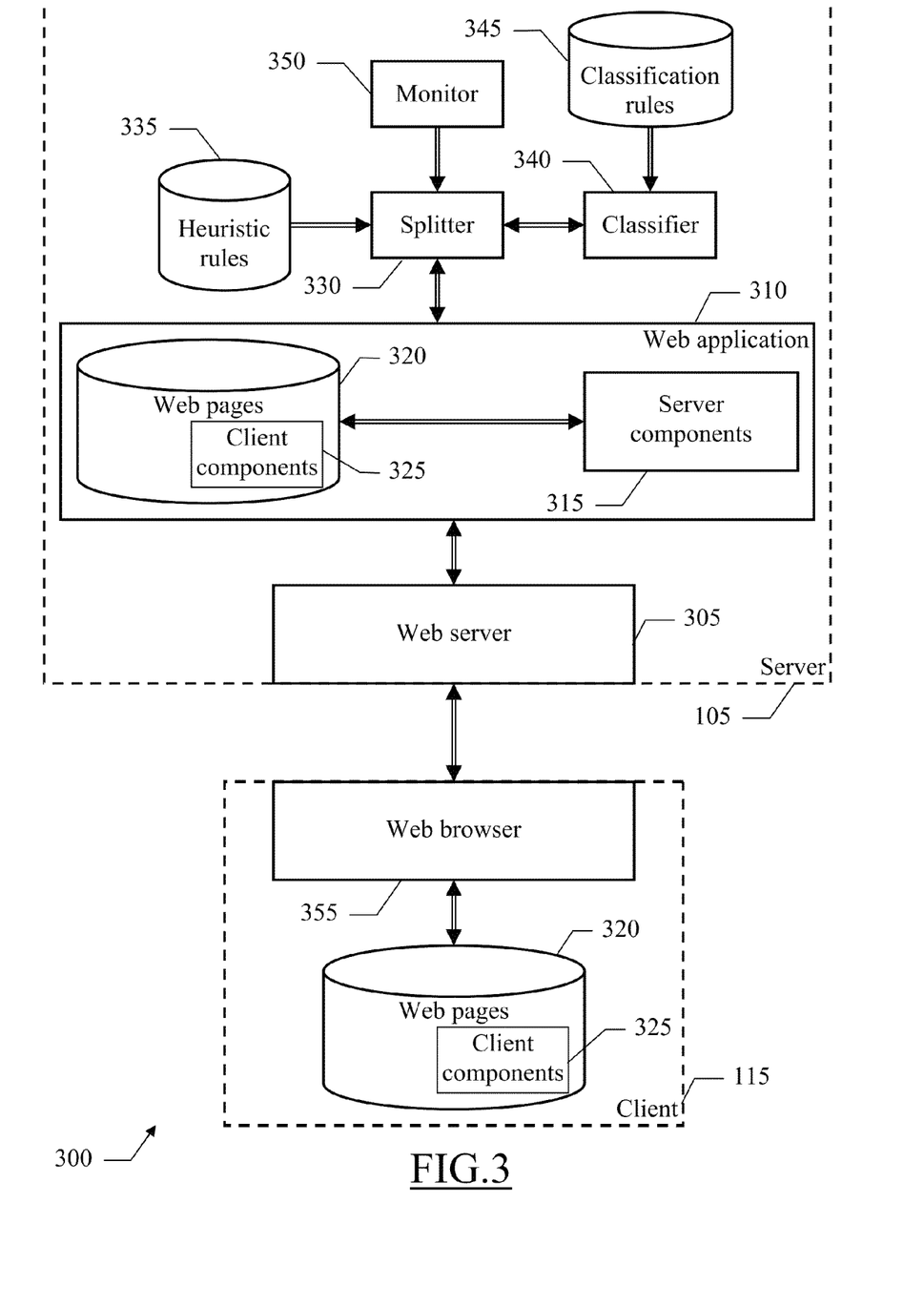
FIG. 3 shows the main software modules that may be used to implement the solution according to an embodiment of the invention.

The main software modules that may be used to implement the solution according to an embodiment of the invention are shown in the FIG. 3.

These software modules are denoted as a whole with the reference 300. The information (programs and data) is typically stored in the mass memory and loaded (at least partially) into the working memory of each (client and server) computer when the programs are running, together with an operating system and other application programs (not shown in the figure). The programs are initially installed onto the mass memory, for example, from external storage units.

A generic server 105 runs a web server 305, which processes every request submitted to the server 105 by the clients 115 (only one shown in the figure) accessing the web site(s) hosted thereon. For this purpose, the web server 305 dispatches each request to a web application 310 implementing the corresponding web site. The web application 310 serves each request by executing a corresponding server processing component 315; for example, the server processing component 315 may be a servlet (i.e., a persistent small program written in the Java language). The server processing component 315 may generate a web page 320 (or a portion thereof) dynamically from a corresponding template (not shown in the figure), which web page 320 is then returned to the client through the web server 305. The web page 320 comprises the definition of its rendering and of one or more client processing components 325 each one associated with a command of the web page 320 (for example, a button) that may be used to submit a corresponding next request; for example, the client processing component 325 may be a JavaScript (i.e., a script embedded in the HTML definition of the web page 320) or an applet (i.e., an external script identified in the HTML definition of the web page 320).

In the solution according to an embodiment of the invention, the web application 310 interacts with a splitter 330 that is used to split the processing logic for serving each next request into the corresponding server processing component 315 and client processing component 325. For this purpose, in a proposed implementation the splitter 330 accesses a repository 335 storing heuristic rules. In another proposed implementation, the splitter 330 interacts with a classifier 340 that is used to classify each client 115 according to its computational capability; for this purpose, the classifier 340 accesses a repository 345 storing classification rules. In any case, the splitter 330 may also exploit a monitor 350, which is used to monitor a usage of computational resources of the server 105.

Moving to the client 115, a web browser 355 is used to surf through the Internet by the user of the client 115. Particularly, for each desired web page 320 (identified by its URL) the web browser 355 submits a corresponding request to the respective server 105. Once the web page 320 has been received by the web browser 355, it is loaded by interpreting its HTML definition. This results in the rendering of the web page 320 into a window (or a frame) of the web browser 355. The user may then interact locally with the web page 320 in different ways (for example, by entering data with the keyboard and selecting commands with the mouse, by performing the same operations with the touch-screen, and the like). The selection of each command of the web page 320 causes the execution of the corresponding client processing component 325, with the possible submission of a corresponding request to the server 105.

In this way, the above-described solution may be applied to standard web applications in a way that is completely opaque to the clients (which may exploit it by using standard web browsers).

Figure 4A:
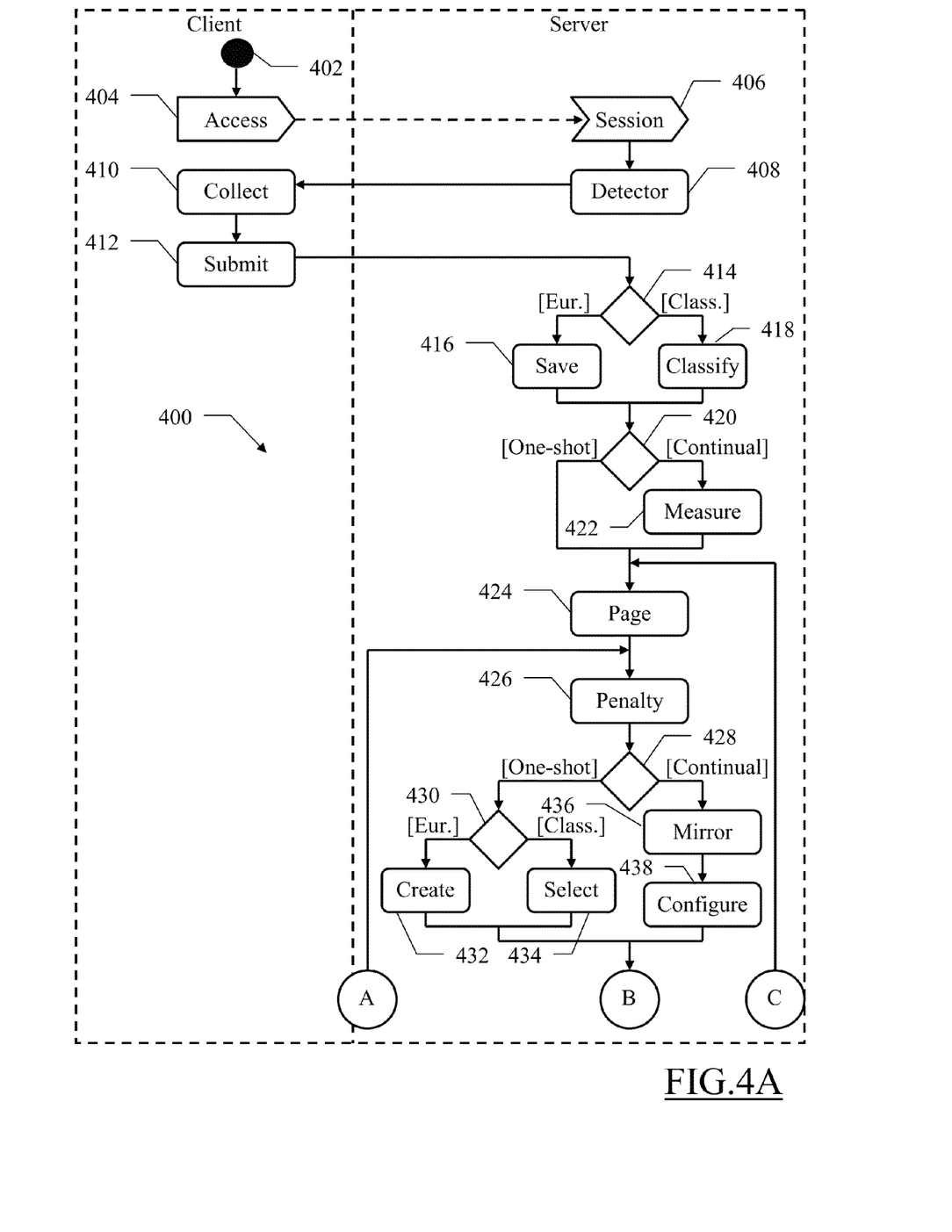
FIG. 4A-FIG. 4B show an activity diagram describing the flow of activities relating to an implementation of the solution according to an embodiment of the invention.
Figure 4B:
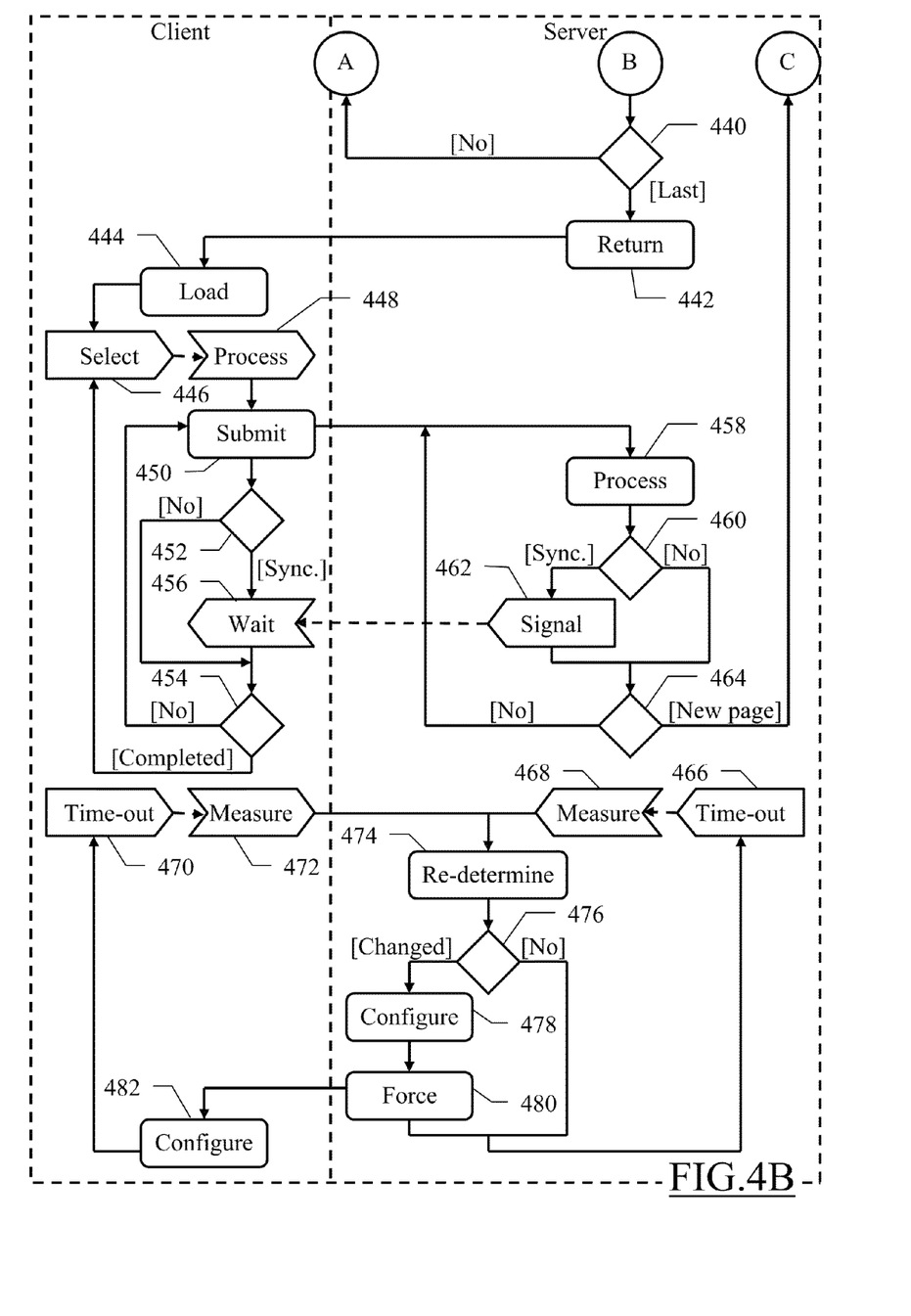

An activity diagram describing the flow of activities relating to an implementation of the solution according to an embodiment of the invention is shown in the FIG. 4A-FIG. 4B. In this respect, each block in the diagram may represent a module, segment or portion of code, which comprises one or more executable instructions for implementing the specified logical function (or more).

Particularly, an exemplary process that may be used to control a distributed software application is represented with a method 400. The method 400 begins at the black start circle 402 in the swim-lane of a generic client, and then passes to block 404 as soon as the user of the client desires to access the distributed software application. For this purpose, the user enters the URL of the web page defining its entry point (for example, the home page) into an address bar of the web browser. This causes the submission of a corresponding request to the server hosting the web site (as indicated by its domain name comprised in the URL).

In response thereto, the server (being listening for any request that may be submitted thereto) at block 406 serves the request by creating a corresponding new session identified by a unique session identifier (for example, assigned dynamically to the client or defined by login information of its user). A specific client processing component designed to detect the computational capability of the client (hereinafter referred to as detection component) is then returned thereto at block 408 (together with the URL of the required web page and the session identifier); for example, the detection component is an applet signed by a trusted source (for example, an owner of the web site, as certified by a trusted authority).

Returning to the swim-lane of the client, the web browser receives the detection component at block 410. This causes its automatic launching (assuming that it has been authorized, either automatically or upon request). The detection component collects information about the computational resources of the client (for example, processing power, working memory space and speed, mass memory speed, graphical adapter characteristics, operating system type, browser type, and the like) by invoking standard APIs of its operating system. Continuing to block 412, a request for executing a pre-defined server processing component indicated in the detection component is submitted to the server, by passing the URL of the same web page, the session identifier of the client and the information about its computational resources.

In response thereto, the server (again being listening for any request that may be submitted thereto) at block 414 serves the request by launching the server processing component indicated therein. In this case, the flow of activity branches again according to an algorithm that is used to split the processing logic (as described below). Particularly, in the case of a heuristic algorithm, the information about the computational resources of the client is saved at block 416 into the corresponding session (as indicated by its identifier). Conversely, in the case of a classification algorithm, the client is classified at block 418. For example, a set of disjoint classes is pre-defined for different power levels of the clients (such as 2-5 classes from a lowest power level to a highest power level). The corresponding classification rules define a decision tree with a set of decision nodes each one specifying a test on a metric of the computational resources of the clients (i.e., its processing power, working memory space and speed, mass memory speed, graphical adapter characteristics, operating system and browser type in the example at issue); the branches descending from each node correspond to the possible values of the tested attribute. Each leaf node specifies the class of the client. The class assigned to the client is then saved as above into the corresponding session.

In both cases, the flow of activity continues to block 420 from either the block 416 or the block 418. In this phase, the flow of activity branches again according to an approach that is used to split the processing logic (as described below). Particularly, in a continual approach the flow of activity passes to block 422, wherein a usage of computational resources of the server (for example, percentage of processing power used, percentage of working memory used, number of working sessions opened, and the like) is measured by means of a standard performance-monitoring tool. The flow of activity then continues to block 424; the same point is also reached directly from the block 420 in a one-shot approach.

At this point, the new web page that has to be returned to the client (as indicated in its URL) is generated dynamically from the corresponding template. A loop is then performed for associating the corresponding client processing component with each command that is defined in the web page (which command may be used later on to submit a corresponding next request to the server by the user of the client). The loop begins at block 426, wherein a penalty indicator is determined for the processing logic of the (current) command. The penalty indicator represents a loss of efficiency that might be caused by moving the processing logic from the client to the server. Particularly, the penalty indicator may be based on the amount of local data to be transmitted from the client to the server for this purpose (for example, proportional to its number of bytes).

The flow of activity then branches at block 428 according to the approach that is used to split the processing logic. Particularly, in the one-shot approach the flow of activity further branches at block 430 according to the algorithm that is used to split the processing logic. In the case of the heuristic algorithm, at block 432 the server processing component and the client processing component required to serve the next request are created dynamically by applying the heuristic rules according to the computational resources of the client and the penalty indicator. This implementation is very flexible. Conversely, in the case of the classification algorithm, at block 434 the server processing component and the client processing component required to serve the same next request are selected from pre-defined templates according to the class of the client and the penalty indicator. This implementation is very simple and it has a negligible impact on the performance of the server.

In both cases, the processing logic moves from the server to the client as its processing resources increase, and vice-versa. However, the moving of the processing logic from the client to the server is discouraged as its penalty indicator increases; for example, the processing logic may be maintained on the client (irrespectively of its processing resources) when the amount of local data to be transferred from the client to the server reaches a threshold value. In this way, it is possible to limit the amount of data that is transferred over the network. For example, in a very simple implementation the client processing component alternatively comprises the processing logic for actually processing the next request or a stub code for substituting it. In the first case, the client processing component will process the next request locally. In the second case, instead, the client processing component will serialize any input value required to process the next request (for example, as name/value pairs in the JSON format), will submit a request to the server for the corresponding server processing component by passing these input values (wherein the next request is processed remotely), and then will receive a result of this processing from the server.

Referring back to the block 428, in the continual approach the flow of activity instead passes to block 436, wherein the processing logic required to serve the next request is mirrored into the client processing component and the server processing component (so as to make it entirely available on both the client and the server). The client processing component and the server processing component are configured at block 438 in order to actually split the processing logic between them according to the computational resources of the client, the usage of the computational resources of the server and the penalty indicator. For example, the configurations of the server processing component and of the client processing component are selected from pre-defined patterns according to the class of the client when the server implements the classification algorithm, whereas they are determined by applying the heuristic rules when the server implements the heuristic algorithm.

In both cases, the processing logic (in addition to move from the server to the client as its processing resources increase, and vice-versa, with the moving of the processing logic from the client to the server that is discouraged as its penalty indicator increases) also moves from the server to the client when the usage of the computational resources of the server increase; for example, the processing logic may be moved to the client (irrespectively of the computational capability thereof) when the usage of the computational resources of the server reaches a threshold value. In this way, it is possible to relieve the server when it is overloaded. For example, in a very simple implementation the client processing component comprises two modules, one with the processing logic for actually processing the next request and another one with a stub code for substituting it as above; the command is associated alternatively with one of these modules according to the result of the above-described operation.

In any case, the flow of activity merges again at block 440 from the block 432, the block 434 or the block 438. A test is now made to verify whether all the commands defined in the new web page have been processed. If not, the flow of activity returns to the block 426 to repeat the same operations described above on a next command of the new web page.

Conversely, the loop is exit by descending from the block 440 into block 442, wherein the new web page so obtained (with the client processing components of its command) is returned to the client, together with its session identifier. The new web page is loaded at block 444 in the swim-lane of the client so as to cause its rendering thereon. As soon as the user of the client selects a command of this (new) web page, the flow of activity passes from block 446 to block 448. In response thereto, the client processing component associated with the selected command is launched, so as to cause the local processing of the corresponding request (for example, the actual execution of its processing logic or simply the serialization of its input values in the above-mentioned case). Assuming that the processing of the request requires an interaction with the server, a request for the corresponding server processing component (indicated in the client processing component) is submitted at block 450 to the server (by passing the result of the local processing or the input values, respectively, in the same case as above), together with the session identifier. The flow of activity then branches at block 452 according to the time relationship between the executions of the client processing component and of the server processing component. Particularly, if the executions of the client processing component and of the server processing component are asynchronous (or no server processing component has been invoked) the flow of activity further branches at block 454 according to the progress of the execution of the client processing component. If the execution of the client processing component has not been completed yet, the flow of activity returns to the block 450 to continue it; conversely, the flow of activity returns to the block 446 waiting for the selection of a next command of the web page. Referring back to the block 452, if the execution of the client processing component is instead to be synchronized with the execution of the server processing component, a waiting condition is entered at block 456 for the completion of the execution of the server processing component.

Concurrently, the server (again listening for any request that may be submitted thereto as above) at block 458 serves the request submitted by the client (at the block 450) by launching the server processing component indicated therein. In this case, the server processing component processes the request remotely (for example, by simply completing the processing of the result or entirely processing the input values received from the client processing component in the above-mentioned case). The flow of activity then branches at block 460 as above according to the time relationship between the executions of the client processing component and of the server processing component. Particularly, if the execution of the client processing component is to be synchronized with the execution of the server processing component, a completion of the execution of the server processing component is signaled to the client at block 462 (by returning any possible result thereof). In response thereto, the flow of activity passes from the block 456 to the block 454 in the swim-lane of the client so as to resume the execution of the client processing component as above. Returning to the swim-lane of the server, the flow of activity continues from the block 462 to block 464; the same point is also reached from the block 460 directly when the executions of the client processing component and of the server processing component are asynchronous. If at least a portion of a new web page is to be returned to the client, the flow of activity returns to the block 424 to repeat the same operations described above; conversely, the flow of activity returns to the block 458 waiting for a next request of the client.

In a completely independent way, in the continual approach the flow of activity further passes in the swim-lane of the server from block 466 to block 468 as soon as predefined time-out expires (for example, every 5-30 sec.). In response thereto, the usage of the computational resources of the server is measured again. Likewise, the flow of activity passes in the swim-lane of the client from block 470 to block 472 as soon another predefined time-out expires (for example, every 5-30 sec.). In response thereto, a usage of computational resources of the client (for example, percentage of processing power used, percentage of working memory used, and the like) is measured by the same detection component invoking standard APIs of the operating system of the client; information about the usage of the computational resources of the client is then uploaded onto the server (together with the session identifier). In both cases, the configurations of the client processing component and of the server processing component for each command of the web page that is currently displayed on the client is re-determined at block 474 as above. A test is then made at block 476 to verify whether one or more of the configurations has to be changed. If so, the configuration of each one of these server processing components is changed accordingly at block 478. A command for forcing the required change of the configuration of each corresponding client processing component is sent to the client at block 480 (for example, based on the Ajax technology), together with the session identifier. In response thereto, the configuration of these client processing components is changed accordingly at block 482 in the swim-lane of the client. Particularly, in the example at issue this only requires the change of the modules of the client processing components associated with the corresponding commands. In this way, the splitting of the processing logic between the client and the server may be changed dynamically according to their actual conditions. For example, the processing logic may be moved to the server when the usage of the computational resources of the client reaches a threshold value, and vice-versa. As a result, it is possible to maintain the performance of the client acceptable in any conditions. Moreover, the processing logic may be moved to the client when the usage of the computational resources of the server reaches another threshold value, and vice-versa. As a result, it is possible to self-adapt the performance of the server to its actual workload; particularly, this allows providing a high scalability for free, since the same server may be accessed by a growing number of clients with substantially no reduction of performance, by simply delegating some processing logic to the clients when their number is too high.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the present invention provides a method for controlling a distributed application. The method comprises the following steps. An indication is detected of a computational capability of a client computing machine and/or of a server computing machine. At least part of a page is built in response to a request received by the server computing machine from the client computing machine. The page comprises a set of commands each one for submitting a next request on the client computing machine; a processing logic for serving each next request is split between a client processing component and/or a server processing component. The page with the client processing component for each command is returned to the client computing machine for causing the client computing machine to load the page and execute each client processing component in response to the corresponding next request. Each server processing component is executed in response to the corresponding next request.

However, the distributed application and the page may be of any type (see below); moreover, similar considerations apply when any part of the page is built (for example, a portlet). The page may comprise any type and number of commands (for example, hyper-links, widgets, and the like). The processing logic for each command may be split in any way (see below), by putting it in part into the client processing component and in part into the server processing component, or even entirely into one of them only. Each client and server processing component may comprise any number and type of modules (for example, based on the HTML 5, Ajax, Dojo, FLEX, Flash or JavaBeans technologies).

In an embodiment of the invention, the distributed application is a web application; each page is a web page for loading by a web browser running on the client computing machine.

However, the proposed technique may be applied to any distributed application involving the building of any type of pages (having command that may be associated with client processing components)—for example, based on the WAP, HTTPS, and the like.

In an embodiment of the invention, the step of detecting an indication of a computational capability includes detecting an indication of computational resources and/or of a usage thereof.

However, the computational capability may be defined (at any moment) only by the computational resources, only by their usage or by any combination of them. Moreover, the computational capability may by defined by only parts of the above-mentioned metrics, or by different, additional or alternative metrics (for example, a number of cores of the microprocessors, a network bandwidth, and the like).

In an embodiment of the invention, the step of detecting an indication of a computational capability includes sending a detection component to the client computing machine in response to a request of accessing the distributed application from the client computing machine to cause the execution of the detection component on the client computing machine; the detection component is adapted to detected the indication of the computational capability of the client computing machine and to return the indication of the computational capability of the client computing machine to the server computing machine.

However, the detection component may be of any type (for example, a pure JavaScript module); moreover, it may be sent to the client in any other way (for example, comprised in the first downloaded page).

In an embodiment of the invention, the step of detecting an indication of a computational capability includes detecting the indication of the computational capability in response to an access of the client computing machine to the distributed application.

However, the computational capability may be detected at any other time (for example, while the downloading of the first page is in progress).

In an embodiment of the invention, the method further comprises the steps of monitoring the computational capability, and updating the splitting of each processing logic according to the monitored computational capability.

However, the computational capability may be monitored with any other timing, even not periodically (for example, every time a new page is downloaded) or by any other component (even distinct from the one used to detect the computational capability when the client accesses the distributed application). Moreover, the monitored computational capability may be used in any way for updating the splitting of each processing logic; for example, it is possible to trace a trend of the usage of the computational resources, and update the splitting when this trend indicates an abnormal growing of the usage of the computational resources.

In any case, the two approaches described above may be used in whatever way. For example, it is possible to use the one-shot approach only, the continual approach only or any combination thereof; moreover, the computational capability that is detected either in the one-shot mode or in the continual mode may be defined by the computational resources, by their usage or by both of them (each one defined by the same or different metrics).

In an embodiment of the invention, the step of building at least part of a page includes mirroring each processing logic into the client processing component and the server processing component, and configuring the client processing component and the server processing component according to the computational capability; the step of updating the splitting of each processing logic includes updating the configurations of the client processing component and of the server processing component.

However, the configurations of the client and server processing components may be implemented in any way; for example, instead of having different modules that are associated alternatively with each command, it is possible to have a single module that is always associated with the command but it is provided alternatively with different configuration parameters (which are passed thereto or stored into an external file). In any case, in the continual approach the possibility is not excluded of sending different client processing components to the client computing machine every time the splitting of the corresponding processing logic changes. Vice-versa, in the one-shot approach the possibility it not excluded of mirroring the processing logic into the client and server processing components and configuring the client processing component locally according to the computational capability of the client computing machine.

In an embodiment of the invention, the step of building at least part of a page includes creating the client processing component and the server processing component for each next request according to said computational capability.

However, the client and server processing components may be created in any way (for example, according to an overall capability index based on the metrics defining the computational capability suitably weighted).

In an embodiment of the invention, the step of detecting an indication of a computational capability includes classifying the client computing machine into one of a plurality of pre-defined classes according to the computational capability of the client computing machine; the step of building at least part of a page includes selecting the client processing component and the server processing component for each next request from a plurality of pre-built client processing components and server processing components corresponding to said classes according to the class of the client computing machine.

However, the client computing machine may be classified in any other way (for example, by means of neural networks), into any number and type of classes.

In any case, in both the two algorithms described above, for each command it is possible to have any number of versions of the client and server processing components; for example, it is possible to move processing-intense operations, graphical-intense operations and memory-intense operations alternatively between the client computing machine and the server computing machine so as to obtain corresponding versions of the client and server processing components spanning all their possible combinations.

In an embodiment of the invention, the step of building at least part of a page includes associating the processing logic with a penalty indicator indicative of a loss of efficiency caused by a moving of the processing logic from the client computing machine to the server computing machine; the processing logic is split further according to the penalty indicator.

However, the penalty indicator may be of any type (see below). Moreover, it may be used in any way to define the splitting of the processing logic (for example, simply using it as an additional metric of the computational capability, or as a flag that conditions the moving of the processing logic to the server computing machine after reaching a threshold value). In any case, this feature may also be omitted at all in a simplified implementation.

In an embodiment of the invention, the penalty indicator is based on an amount of data to be transmitted between the client computing machine and the server computing machine during the execution of the client processing component and the server processing component.

However, the penalty indicator may be based on different, additional or alternative values (for example, a type of network connection that increases the penalty indicator as its speed decreases, such as from Ethernet to ADSL, Wi-Fi, LTE, HSDPA, and GPRS).

In an embodiment of the invention, the method further comprises the step of synchronizing the execution of the client processing component and of the server processing component for each next request.

However, this synchronization may be implemented in any way (for example, with only one or multiple interactions between the client computing machine and the service computing machine); in any case, a completely asynchronous implementation is not excluded.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

Another embodiment of the present invention provides a computer program comprising code means for causing a computing system to perform the steps of the above-described method when the computer program is executed on the computing system.

Another embodiment of the present invention provides a computer program product comprising a non-transitory computer readable medium embodying a computer program, the computer program comprising code means directly loadable into a working memory of a computing system thereby configuring the computing system to perform the same method.

However, the above-described solution may be implemented entirely on the server computing machine as a stand-alone module, as a plug-in for the web server, or even directly in the web server itself; alternatively, the same solution may be implemented in each web application. In any case, the possibility of implementing the solution partly on the server computing machine and partly on the client computing machines (for example, by updating their web browsers) is not excluded.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment of the present invention provides a system comprising means configured for performing the steps of the above-described method.

However, the same solution may also be carried out on a system based on a different architecture (for example, a local, wide area, global, cellular or satellite network), and exploiting any type of (wired and/or wireless) connections. In any case, each computer may have another structure or may comprise similar elements (such as cache memories temporarily storing the programs or parts thereof); moreover, it is possible to replace the computer with any computing (or code execution) entity, either based on a physical machine or a virtual machine, or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for controlling a distributed application, the method comprising:
   detecting an indication of a computational capability of a client computing machine and of a server computing machine,
   building a page in response to a request received by the server computing machine from the client computing machine, the page comprising a set of commands each one for submitting a next request on the client computing machine, a processing logic for serving each next request being split between a client processing component and a server processing component, wherein building the page comprises:
      creating the client processing component and the server processing component for each next request according to the computational capability of the client computing machine and the server computing machine, respectively, wherein each next request has a portion of the next request executed on the client computing machine based on the detected computational capability of the client computing machine and the remaining portion of the next request executed on the server computing machine based on the detected computational capability of the server computing machine, and
      associating the processing logic with a penalty indicator indicative of a loss of efficiency caused by a moving of the processing logic from the client computing machine to the server computing machine, the processing logic being split further according to the penalty indicator,
   returning the page with the client processing component for each command to the client computing machine for causing the client computing machine to load the page and execute each client processing component in response to the corresponding next request, and
   executing each server processing component in response to the corresponding next request.

2. The method according to claim 1, wherein the distributed application is a web application, and wherein each page being a web page for loading by a web browser running on the client computing machine.

3. The method according to claim 1, wherein detecting the indication of the computational capability comprises:
   detecting an indication of computational resources of the client computing machine and of the server computing machine either it a one-shot mode, in a continual mode or in a combination of the one-shot mode and the continual mode; or detecting an indication of a usage of the computation resources of the client computing machine and of the server computing machine either in the one-shot mode, in the continual mode, or in a combination of the one-shot mode and the continual mode.

4. The method according to claim 1, wherein detecting the indication of the computational capability comprises:
sending a detection component to the client computing machine in response to a request of accessing the distributed application from the client computing machine to cause the execution of the detection component on the client computing machine, the detection component being adapted to detect the indication of the computational capability of the client computing machine and to return the indication of the computational capability of the client computing machine to the server computing machine.

5. The method according to claim 1, Wherein detecting the indication of the computational capability comprises:
detecting the indication of the computational capability in response to an access of the client computing machine to the distributed application.

6. The method according to claim 1, further comprising:
monitoring the computational capability of the client computing machine and the sever computing machine, and
updating the splitting of each next, request in the processing logic according to the monitored computational capability of the client computing machine and the server computing machine, respectively.

7. The method according to claim 6, wherein building the page comprises:
mirroring each processing logic into the client processing component and the server processing component, and
configuring the client processing component and the server processing component according to the computational capability of the client computing machine and the server computing machine, respectively,
and wherein updating the splitting of each next request in the processing logic comprises:
updating configurations of the client processing component and of the server processing component according to the monitored computational capability of the client computing machine and the server computing machine, respectively.

8. The method according to claim 1, wherein detecting the indication of the computational capability comprises:
classifying the client computing machine into one of a plurality of pre-defined classes according to the computational capability of the client computing machine utilizing a classification algorithm that classifies the client computing machine based on classification rules that define a decision tree with a set of decision nodes each one specifying a test on a metric of the computational resources of the client computing machine,
and wherein building the page comprises:
selecting the client processing component and the server processing component for each next request from a plurality of pre-built client processing components and server processing components corresponding to the plurality of defined classes according to a class of the client computing machine.

9. The method according to claim 1, wherein the penalty indicator is based on an amount of data to be transmitted between the client computing machine and the server computing machine during the execution of the client processing component and the server processing component.

10. The method according to claim 1, further comprising:
synchronizing the execution of the client processing component and of the server processing component for each next request.

11. A computer program product comprising a non-transitory computer readable medium having a computer readable program for causing a computing system to control a distributed application stored therein, wherein the computer readable program, when executed on the computing system, causes the computing system to:
detect an indication of a computational capability of a client computing machine and of a server computing machine,
build a page in response to a request received by the server computing machine from the client computing machine, the page comprising a set of commands each one for submitting a next request on the client computing machine, a processing logic for serving each next request being split between a client processing component and a server processing component, wherein the computer readable program to build the page further causes the computing system to:
create the client processing component and the server processing component for each next request according to the computational capability of the client computing machine and the server computing machine, respectively, wherein each next request has a portion of the next request executed on the client computing machine based on the detected computational capability of the client computing machine and the remaining portion of the next request executed on the server computing machine based on the detected computational capability of the server computing machine, and
associate the processing logic with a penalty indicator indicative of a loss of efficiency caused by a moving of the processing logic from the client computing machine to the server computing machine, the processing logic being split further according to the penalty indicator,
return the page with the client processing component for each command to the client computing machine for causing the client computing machine to load the page and execute each client processing component in response to the corresponding next request, and
execute each server processing component in response to the corresponding next request.

12. A system for controlling a distributed application comprising:
a processor; and
a memory coupled to the processor, wherein the memory comprises instructions which, when executed by the processor, cause the processor to:
detect an indication of a computational capability of a client computing machine or of a server computing machine,
build a page in response to a request received by the server computing machine from the client computing machine, the page comprising a set of commands each one for submitting a next request on the client computing machine, a processing logic for serving each next request being split between a client processing component and a server processing component, wherein the instructions to build the page further cause the processor to:
create the client processing component and the server processing component for each next request according to the computational capability of the client computing machine and the server computing machine, respectively, wherein each next request has a portion of the next request executed on the client computing machine based on the detected computational capability of the client computing machine and the remaining portion of the next request executed on the server computing machine based on the detected computational capability of the server computing machine, and associate the processing logic with a penalty indicator indicative of a loss of efficiency caused by a moving of the processing logic from the client computing machine to the server computing machine, the processing logic being split further according to the penalty indicator, return the page with the client processing component for each command to the client computing machine for causing the client computing machine to load the page and execute each client processing component in response to the corresponding next request, and execute each server processing component in response to the corresponding next request.

13. The system of claim 12, wherein the instructions to detect the indication of the computational capability further causes the processor to:

detect an indication of computational resources of the client computing machine and of the server computing machine either in a one-shot mode, in a continual mode, or in a combination of the one-shot mode and the continual mode: or detecting an indication of a usage of the computation resources of the client computing machine and of the server computing machine either in the one-shot mode, in the continual mode or in a combination of the one-shot mode and the continual mode.

14. The system of claim 12, wherein the instructions o detect the indication of the computational capability further causes the processor to:

send a detection component to the client computing machine in response to a request of accessing the distributed application from the client computing machine to cause the execution of the detection component on the client computing machine, the detection component being adapted to detect the indication of the computational capability of the client computing machine and to return the indication of the computational capability of the client computing machine to the server computing machine.

15. The system of claim 12, wherein the instructions to detect the indication of the computational capability further causes the processor to:

detect the indication of the computational capability in response to an access of the client computing machine to the distributed application.

16. The system of claim 12, wherein the instructions further cause the processor to monitor the computational capability of the client computing machine and the server computing machine, and update the splitting of each next request in the processing logic according to the monitored computational capability of the client computing machine and the server computing machine, respectively.

17. The system of claim 16, wherein the instructions to build the page further causes the processor to:

mirror each processing logic into the client processing component and the server processing component, and configure the client processing component and the server processing component according to the computational capability of the client computing machine and the server computing machine, respectively, and wherein the instructions to update the splitting of each next request in the processing logic further causes the processor to:

update configurations of the client processing component and of the server processing component according to the monitored computational capability of the client computing machine and the server computing machine, respectively.

18. The method according to claim 1, wherein detecting the indication of the computational capability comprises:

classifying the client computing machine into one of a set of predefined patterns according to a previously saved indication of the computational capability of the client computing machine utilizing a heuristic algorithm that classifies the client computing machine based on heuristic rules according to the computational resources of the client computing machine, and wherein building the page comprises:

selecting the client processing component and the server processing component for each next request from a plurality of pre-built client processing components and server processing components corresponding to the plurality of defined classes according to a class of the client computing machine.

* * * * *